United States Patent [19]
Minnaja

[11] 3,887,906
[45] June 3, 1975

[54] OPTICAL ASSOCIATIVE MEMORY USING COMPLEMENTARY MAGNETIC BUBBLE SHIFT REGISTERS

[75] Inventor: Nicola Minnaja, Milan, Italv

[73] Assignee: Honeywell Information Systems Italia, Caluso, Italy

[22] Filed: June 28, 1973

[21] Appl. No.: 374,624

[30] Foreign Application Priority Data
June 28, 1972 Italy .................................. 26323/72

[52] U.S. Cl..................... 340/174 GA, 340/173 AM, 340/170 LM; 340/174 YC; 340/174 TF
[51] Int. Cl.. G11c 11/16; G11c 11/42; G11c 15/00
[58] Field of Search............ 340/173 AM, 173 LT, 340/173 LM, 174 YC, 174 GA, 173 TF

[56] References Cited
UNITED STATES PATENTS

| | | | |
|---|---|---|---|
| 3,407,393 | 10/1968 | Haas et al. | 340/173 AM |
| 3,542,448 | 11/1970 | Reynolds et al. | 340/173 AM |
| 3,572,881 | 3/1971 | Nishida et al. | 340/173 AM |
| 3,614,191 | 10/1971 | Sakaguchi et al. | 340/173 LM |
| 3,765,749 | 10/1973 | LaMacchia | 340/173 LM |

OTHER PUBLICATIONS

Cobb et al., Associatively Addressed Holographic Storage, IBM Technical Disclosure Bulletin, Vol. 13, No. 5, 10/70, pp. 1070–1071,
Craig et al., Bubble Domain Electronic–to–Optical Image Transducer, IBM Technical Disclosure Bulletin, Vol. 13, No. 1, 6/70, pp. 147–148.
Sakaguchi et al., Associative Memory System Utilizing Holography, IEEE Transactions on Computers, Vol. C–19, No. 12, 12/70, pp. 1174–1180.

*Primary Examiner*—Stuart N. Hecker
*Attorney, Agent, or Firm*—Fred Jacob

[57] ABSTRACT

An associative memory system includes an optical supporting member having bit storage elements with an optical response variable between two distinct values, representing the bit values. Each bit is recorded in two complementary forms in two conjugate regions of the support with each pair of conjugate regions being assigned to bits of a same order of all words. Predetermined regions of the support conforming to the information content for which the associative memory is interrogated are selectively illuminated. The optical responses of these regions are superposed on an electro-optical detecting device so that the detecting device is responsive to all of the illuminated bits of a single word. In a first embodiment, the information is recorded as transparent and opaque elementary areas on a photographic plate which is interrogated by a pair of complementary matrixes of coincidence-selected photoemitters arranged in conjugate pairs, each pair being assigned to a bit order. The light from the photoemitters passes through the photographic plate and is concentrated by a "fly eye" optical system onto a detecting device. In a second embodiment, the information is recorded on a photographic plate as an array of pairs of complementary holograms. Read-out is effected by a coherent light beam deflected along two orthoganal directions to illuminate in sequence one or the other of the complementary holograms of the interrogated pair. The real image of the information stored in the illuminated hologram is thus formed in registration with an array of photodetector elements which memorize the signals set up in response to the illumination. In a third embodiment, the information is recorded by means of "magnetic bubbles" obtained in the presende of a magnetic field on a plate of orthferritic material. Since the magnetic bubbles are optically active and rotate the polarization state of incident light, with the use of polarizing and analyzing sheets they appear as opaque or transparent spots and are detected by photodetectors in response to associative interrogation as described above.

3 Claims, 10 Drawing Figures

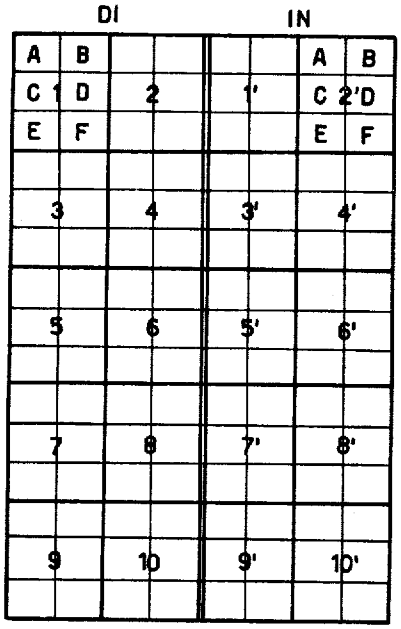
FIG. 2
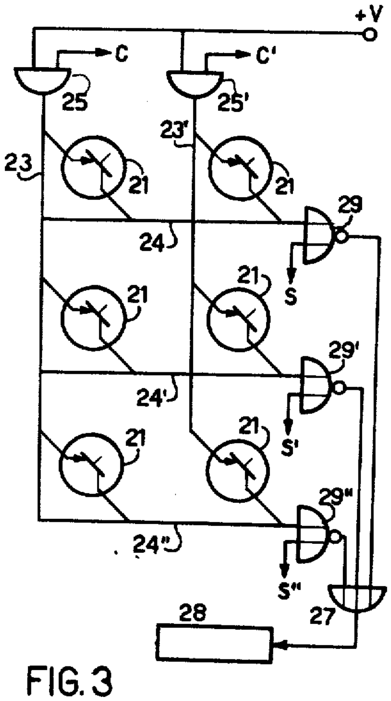
FIG. 3
| | 1 | 2 | 3 | 4 | 5 | 6 | 7 | 8 | 9 | 10 |
|---|---|---|---|---|---|---|---|---|---|---|
| A | 1 | 1 | 0 | 1 | 0 | 1 | 0 | 0 | 1 | 0 |
| B | 1 | 0 | 1 | 0 | 0 | 1 | 0 | 1 | 0 | 0 |
| C | 0 | 0 | 1 | 0 | 0 | 1 | 0 | 1 | 1 | 0 |
| D | 1 | 1 | 0 | 1 | 0 | 1 | 1 | 0 | 1 | 0 |
| E | 0 | 0 | 0 | 1 | 0 | 1 | 1 | 0 | 0 | 1 |
| F | 1 | 1 | 0 | 1 | 0 | 1 | 0 | 0 | 1 | 0 |
| | | | | | | | | | | |
|---|---|---|---|---|---|---|---|---|---|---|
| DE | 1 | 1 | 0 | 1 | 0 | 1 | X | X | 1 | 0 |
FIG. 4

OPTICAL ASSOCIATIVE MEMORY USING COMPLEMENTARY MAGNETIC BUBBLE SHIFT REGISTERS

BACKGROUND OF THE INVENTION

The present invention relates to an optical associative memory system for recording digital information, in read-only as well as in read-write execution. The invention may be applied with remarkable advantages in the field of digital data processing systems.

It is known that the usual memories, called "addressable memories," required the knowledge of the addresses of the cells containing the information for retrieving the same. On the contrary, in an associative memory, the whole, or partial, knowledge of information which is possibly recorded in some memory cells, enables the retrieval of the address of the cells containing the information, or the ascertainment that the information is not recorded in the memory.

In addition, if only part of the information required is known, it is possible to read-out all of the recorded information and, in some cases, to modify the same.

Assuming, for instance, that each cell of the memory contains an eight-bit word, the associative memory may deliver the addresses of all the cells containing for example, four given bits in the first four bit locations, whatever the content of the remaining four bit locations may be.

Characteristic of the associative memory is its parallel operation, as all the cells of the memory are interrogated at the same time, with respect to the information contained there, or to part of the same; and the response is delivered substantially at the same time by all the interrogated cells.

If the memory is of the read-write type, an arithmetical unit may be provided in correspondance to every memory cell for modifying the content of the cell according to proper instructions. Thus, an "associative computer" is obtained, which may carry out all operations required by the instructions at the same time on the content of all cells identified, by the interrogation, as conforming to given conditions.

It is clear that the associative memories may be of paramount interest for the electronic computer technique; in case of non-modifiable memories, or of memories which are modifiable only by particular means, they may form read-only memories of large capacity, in which all the cells of a memory block may be interrogated at a time; in case of modifiable memories, they may lead to the building up of an associative computer, capable of processing a large number of words at a time.

In view of this interest, many attempts have been carried out and many experimental models built in order to achieve a satisfactory associative memory. First, all technologies employed for addressable memories have been tested in order to obtain corresponding associative memories: in particular, cryoscopic, or superconductive memories, magnetic core memories, and thin film memories. A rather complete list of such technologies is given at page 511 of the article by A. G. Hanlon: "Content Addressable and Associative Memory Systems - A Survey," published in I.E.E.E. Transactions on Electronic Computers EC 15, Aug. 4, 1966.

These attempts have met with different success, but none of them, until now, has asserted itself, for different reasons, primarily because of the difficulty of obtaining at moderate costs the high information density, the high number of input-output channels, and the high operating speed which are required for adequately exploiting the characteristic features of the associative memories.

SUMMARY OF THE INVENTION

The present invention overcomes these difficulties by employing opto-electronics and magneto-optical means, and by taking advantage of the characteristics of optical devices for obtaining associative memories having very high recording density, very high parallelism, and sufficient operating speed.

The invention consists substantially in recording the binary information, comprising a given number of words having the same number of bits, on a suitable optical supporting means, comprising bit storage elements having an optical response variable between two distinct values, representative of the bit value, each bit being recorded in two complementary forms, respectively called direct and inverse form, in two conjugate regions of said support, each pair of said conjugate regions being assigned to the bits of a same order of all words; in selectively and uniformly illuminating predetermined regions of said support in confirmity to the information content in respect to which the associative memory is interrogated; and in superposing the optical responses of said regions on an electro-optical detecting device, comprising as many detectors as are the words of the memory, in such as way, that each detector is responsive to the optical cumulative response resulting from the superposition of the responses of all the illuminated bits of a single word.

According to a first aspect of the invention, the information is recorded in the form of transparent and opaque elementary areas on a photographic plate, providing a pair of conjugate regions for each bit order, and recording, respectively, in direct and inverse form, and in the same respective location in both regions of each pair, the bits of a same order of all words. The interrogation device consists of a pair of complementary matrixes of coincidence-selected light sources, for example photoemitters, arranged in conjugate pairs, each pair being assigned to a bit order. In each pair of said light sources, only one source may be lit up in conformity to the binary value of the interrogation bit.

The light emitted by the light sources passes through the photographic plate and is concentrated by a "fly eye" optical system on a detecting device comprising an array of photodetecting elements, each element corresponding to a word; these photoelements are sensed to find out which ones are not illuminated by the image resulting from the superposition of the images of the illuminated bit regions, and the non-illuminated elements correspond to the words which match the interrogation word.

According to a second aspect of the invention, the information is recorded on a photographic plate in form of an array of pairs of complementary holograms, each one recording in direct, and respectively in inverse form, all the bits of the same order of every word, and is read-out by means of a coherent light beam which is deflected along two orthogonal directions by an opto-electronic deflecting system, in such a way, as to illuminate in sequence either one or the other of the complementary holograms of each interrogated pair, according to the interrogation bit, thus forming a real image of the information contained in the illuminated holograms in registration with an array of photodetector elements, capable of memorizing the electrical signals set up in response to the illumination, for the time needed to scan the holograms and to sense the photodetectors for finding out which ones have not been illuminated by the succession of images.

Lastly the invention may be applied to a read-write optical memory system provided with an output device and associated arithmetical units, capable of processing each associatively selected word, in response to suitable instructions.

According to said third aspect of the invention, the information is recorded by means of "magnetic bubbles" obtained in the presence of a magnetic field, on a plate of orthoferritic material, said bubbles being generated, cancelled or displaced according to known methods. As the magnetic bubbles are optically active, that is, as they rotate the polarization plane of the incident light, by the use of a polarizing and of an analyzing device, they may appear as opaque spots on a transparent background or vice versa, and may be detected by photodetectors. This memory may be associatively interrogated as explained above, and the selected words may be modified according to proper instructions by the associated arithmetical units, a bubble detecting device being assigned to the output of each bit region, to provide input signals to said arithmetic units.

BRIEF DESCRIPTION OF THE DRAWINGS

These and other features and advantages of the invention will appear clearly from the following detailed description of some preferred embodiments, with reference to the attached drawings, in which:

FIG. 2 shows the layout of the information elements, registered on the optical support according to said embodiment.

FIG. 3 is the simplified wiring diagram of the detecting matrix of said embodiment.

FIG. 4 is a table showing an example of words recorded in the associative memory of an interrogation descriptor for this memory.

DETAILED DESCRIPTION OF THE PREFERRED EMBODIMENTS

Figure 1:
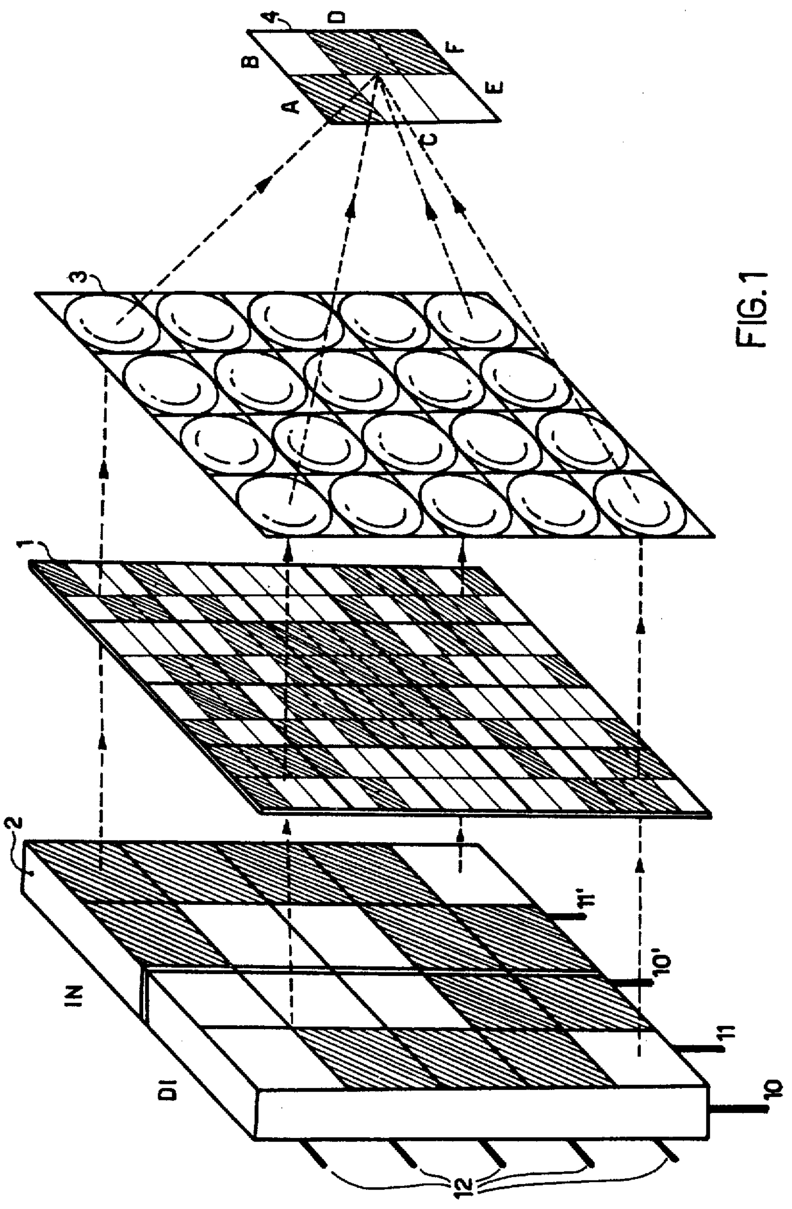
FIG. 1 is a schematic perspective view of a device of an optical read-only associative memory, according to a first preferred embodiment.

FIG. 1 is a schematic representation of the device according to a first preferred embodiment. Reference numeral 1 indicates the optical support of the information, which is a photographic plate on which some area elements are opaque and other ones are transparent. In the example considered, the memory is a fixed memory comprising six words, indicated by A, B, C, D, E, and F having ten bits each. The corresponding information is registered according to the pattern shown in FIG. 2. The plate is divided in two halves, indicated respectively by DI and IN. Each half plate, for instance DI, comprises ten regions, one for each bit order arranged in two columns of five each, as shown by the numbering of FIG. 2, and corresponding to as many conjugate regions in the IN half plate. Each bit region comprises six elementary areas, or recording elements, each one of them being assigned to a word, in the order indicated by the numbering of two of these regions, in FIG. 2. The elementary areas of the half-plate IN of each region record the inverse values of the bit recorded in the homologous areas, that is of the areas having the same location, in the conjugate region in the DI half-plate. If, for example, the binary value ONE is represented by an opaque elementary area in the DI half-plate, the homologous elementary area of the conjugate region in the IN half-plate is transparent.

Reference numeral 2 indicates, in FIG. 1, a matrix of photoemitters coincidence controlled by a set of vertical leads 10, 10′,11, 11′; and a set of horizontal leads 12. Each photoemitting element has a dimension sutiable for illuminating with substantially uniform intensity one of the regions assigned to each bit in the plate 1, the matrix 2 consists of two halves, indicted by DI and IN, each one including two columns of five photoemitters. Each photoemitter is lit up when a voltage higher than a threshold voltage is applied between the vertical and the horizontal leads to which it is connected. Usually the photoemitters corresponding to conjugate regions are controlled in a complementary way, that is, if one of them is lit up, the other is off. However, it is possible that both conjugate photoemitters are off, but both may not be lit-up at the same time. The photoemitter matrix is preferably obtained in integrated form: a device adapted to form an integrated photoemitter matrix is, for instance, described in the article "Optoelectronics Memories: Light to Read-out by," Richard D. Stewart, published in Electronics, Mar. 3, 1969, Page 113.

For clarity in FIg. 1 it has been assumed that the emitting surface of each photoemitter extends over the whole area assigned to each bit regions; and the photoemitters which, in the example considered, are considered light-emitting, are shown in white, while the ones considered off are hatched.

Reference numeral 3 indicates, in FIG. 1, an optical device of the type commonly called a "fly-eye," formed by a matrix of lenses, each lens corresponding to a bit regions on the memory plate, and so arranged, as to focalize and superimpose all images of the bit regions on the same focal plane, and on the same detecting matrix, which in FIG. 1 is indicated as a simple screen 4, subdivided in elements assigned to the different words.

It is clear that, by a suitable choice of the optical characteristics of fly-eye device 3, the image of each bit region may be opportunely enlarged with respect to the actual dimension, in order to be adjusted to the effective dimensions of the detecting matrix.

Each detecting element of this matrix, assigned to a word, will be illuminated or not according to the conditions of illumination and of transparency of the different homologous recording elements in all bit regions whose images are superimposed on said matrix 4.

It is easy to see that, in order for an element of this matrix to be illuminated, it is sufficient that one of the homologous transparent elementary areas, be illuminated; whereas, to have a non-illuminated detecting element, it is necessary that no one of the homologous transparent elemtary areas be illuminated.

According to the preferred embodiment herein described, the detecting matrix is formed by a matrix of phototransistors 21, as shown in FIG. 3, each phototransistor having the emitter connected to a column lead 23 or 23', and the collector to a row lead 24, 24' or 24'', the base remaining unconnected. As known, the phototransistors are substantially insulating for both directions of conduction, if not illuminated, and become conductive if illuminated. The column leads 23 and 23' are connected to the output lead of two-input AND gates 25 and 25', having an input connected to a voltage source +V, and the other input connected to a control terminal C or C'. Each row lead is connected to a first input of a NOR gate 29, 29', or 29'', whose second inputs are connected to control terminals S, S', S'' and whose outputs, through an OR gate 27 are connected to the input of a memory device, for instance, to a shift register 28.

If the photoemitters of the matrix 2 are selectively lit up, in the manner that will be explained later on, the light will illuminate only some phototransistors 21, connecting electrically the respective column lead and row lead. Only the non-illuminated phototransistors are non-conductive.

For detecting which of them are in non-illuminated condition, a signal of binary level ZERO is sent through terminal C to enable the gate 25, and subsequently, by level ZERO signals applied singularly and in succession to the terminals S, S', and S'', the gates 29, 29', and 29'' are enabled. Thus, the elements of the third column are sensed in succession: the ones which are non-conducing send, through the associated NOR gate, and OR gate 27, a ONE signal to the shift register 28.

Afterwards, the gate 25 is inhibited and the gate 25' is enabled, thus sensing the elements of the second column. At the end of the operation the register 28 stores ONE values in positions corresponding to the non-illuminated phototransistors.

It must be remarked that this is only one of the methods which may be used for providing circuit means to detect the illuminated or non-illuminated conditions of the matrix elements, and for generating a set of signals representing the same, as well as only one of the possible ways of storing such set of signal for further processing. For example, the phototransistors may have independent outputs, thus obtaining a set of individual signals on separate output leads, which may be recorded, or sensed, or directly processed according to different methods known in the art.

FIG. 4 shows an example of bit patterns forming six words A, B, C, D, E and F, corresponding to the pattern of opaque and transparent areas on the memory support, as shown in FIG. 1, wherein in the half-plate DI the ONES are represented by opaque areas, the ZEROS by transparent areas, the opposite being true for the half-plate IN. Assume now that it is requird to know the addresses of those of the six words A to F, which have the bits 1 to 6, 9 and 10 as shown by the "descriptor" DE, the bits 7 and 8 being "don' t care." The descriptor is the sequence of bits according to which the associative memory is interrogated. By using the photoemitter matrix, only the regions of the half-plate IN corresponding to the bits of value ZERO of the descriptor are illuminated. No region corresponding to the "don't care" bits of the descriptor is illuminted. It is easy to see that, as the images of the different illuminated bit regions are superimposed on the matrix 4, the only detector elements of matrix 4 which are not illuminated are these which correspond to words wherein each descriptor bit of value ONE, corresponding to a lit-up photoemitter in half-matrix DI, meets an opaque homologous word area in the half-plate DI, representative of a ONE bit value, and each descriptor bit of value ZERO, corresponding to a lit-up photoemitter in half matrix IN meets an opaque homologous word area in the half-plate IN representative of a ZERO bit value.

The photoemitters corresponding to the "don't care" bits are not lit-up in any half matrix, and therefore do not contribute to any illumination of the detector matrix.

It follows that the non-illuminated elements of the detector matrix coreespond to the words wherein the bit values defined by the descriptor coincide fully with the bit values of the word: in the described example, the words A,D,F.

The time of selective lighting up of the matrix photoemitters must be sufficient for the scanning of the detecting matrix and the memorizing of the results. The number of photoemitters may be reduced by one half by using a system of controlled optical deflection, to illuminate alternatively the half-plate DI and the half-plate IN and correspondingly complementarily lighting up the photoemitters. The number of the photoemitters, or, generally speaking the light sources, may be reduced to one by using an electronic beam deflecting and suppressing system, to control the beam generated by this light source, for instance a laser, for illuminating slectively and sequentially the different regions. In this case, the electronic detector matrix, on which the images of the different regions fall in succession, must have memory characteristics. This may be easily obtained using the matrix represented in FIG. 6, wherein each element is formed by a photoresistor 51 and a capacitor 52 parallel connected, each element being connected, as shown, to a grid formed by the column leads 53 and 53', and the row leads 54, 54' and 54''. Each column lead is connected at one end to the output of an AND gate 55 or 55' having a first input connected to a voltage source +V and a second input connected to a control terminal C. At the other end, each column lead is connected to the input of a respective AND gate 56 or 56', the second input of said gates being connected to a control terminal Y. The output leads of gate 56 and 56' are connected thru an OR gate 57, to the input of a shift register 58. The row leads are connected to a first input of corresponding AND gates 59, and 59' and 59'' having a second input lead connected to a control terminal X. The output is grounded.

As known, the photoresistors have a high resistance value when not illuminated, and a low one when illuminated.

The determination of which ones among the matrix elements have never been illuminated during the associative reading out is effected by proceeding as follows. Initially the matrix is not illuminated, and the AND gates 55 and 55', 59, 59' and 59'' are enabled at the same time, while the gates 56 and 56' are inhibited. Thus, all capacitors 52 are charged across voltage +V and ground. Afterwards, all gates are inhibited and the interrogation by selective illumination of the detector matrix is carried out.

When one of the photoresistors is illuminated, the associated capacitor 52 is rapidly discharged through the same resistor, so that only the capacitors of the non-illuminated elements remain charged. To detect which ones are in this condition, for example first the gate 56, and then in succession and signularly, the gates 59, 59', and 59'' are enabled. Thus, the elements of the first column are sensed in succession, and those which are charged send through gates 56 and 57 signals of level ONE to shift register 58. Afterwards the gate 56 is inhibited, and gate 56' is enabled, thus sensing, by enabling the same gates as before, the second column. At the end of the sensing operation the register 58 will contain the address of the elements which have not been illuminated.

It must be remarked that this is only one way for building up a circuit device adapted for memorizing the signal generated by photosensitive elements for the time necessary for sensing and registering in a storage device. Other methods are possible and known to anyone skilled in the art, and may be applied according to the characteristics of the detector matrix such as its size, the required speed of operation, and so on.

In a second embodiment of the invention, use is made of the holographic processes for recording and reading-out.

Large capacity holographic optical memories are known at the present state of the art. The organization and operation of a holographic memory is described for example in the book of R. J. Collier, C. B. Burckhardt, and L. H. Lin, Optical Holography, Academy Press, 1971, at pages 476 to 483. This embodiment of the present invention is now described with reference to the application of known principles and methods of holography, for obtaining an associative optical-electronic memory with original characteristics.

For a better understanding of the invention the principles and characteristics of holography are briefly recalled, with special reference to optical holographic memories. It is assumed that the information to be holographically recorded is orginally registered on a primary optical support as a pattern of transparent and opaque areas, as shown in the preceding case by FIGS. 1 and 2.

Figures 5A, 5B:
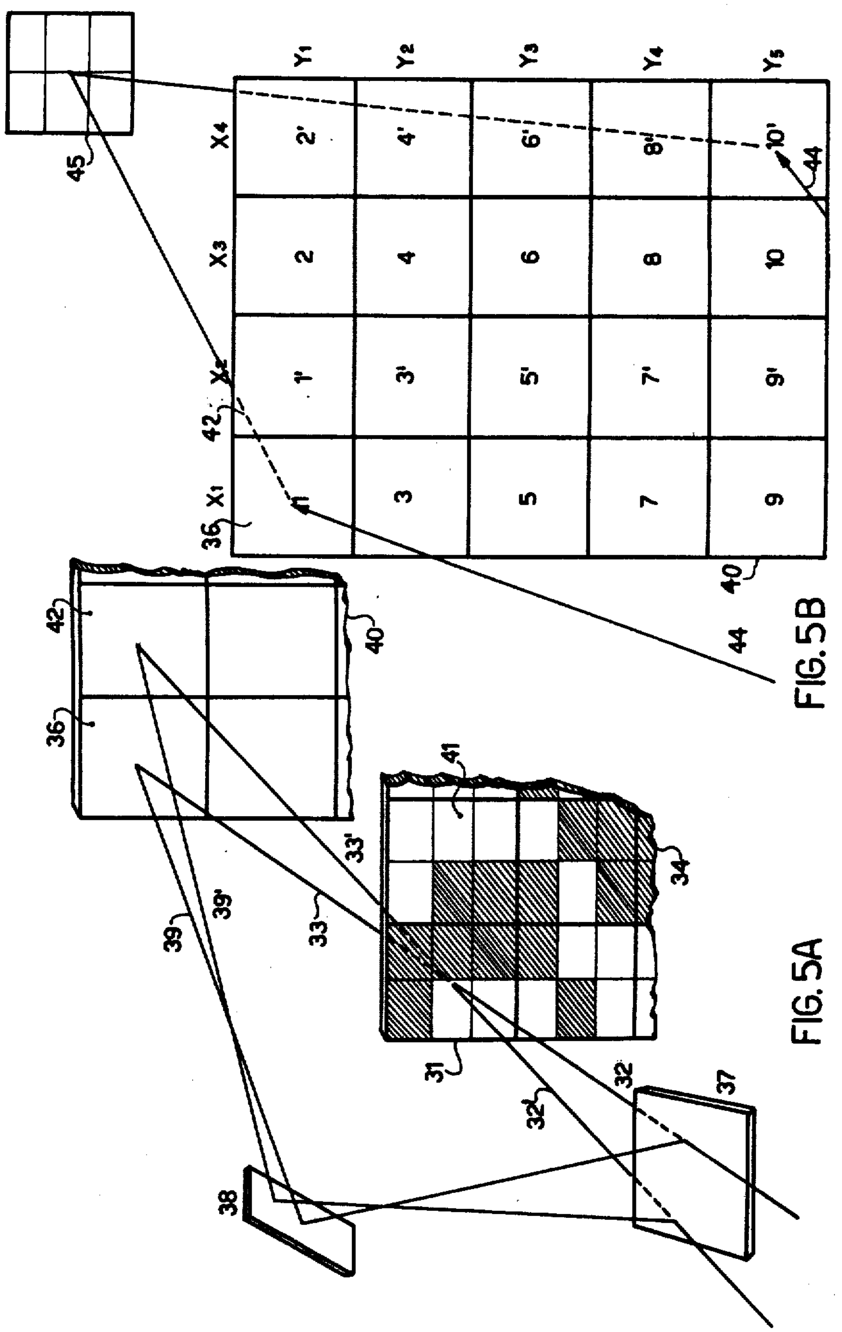
FIG. 5A is a schematic perspective view of the holographic recording device for an associative memory according to a second embodiment.
FIG. 5B is a schematic perspective view of the associative reading-out device of the holographically recorded information according to said second embodiment.

In FIG. 5A, reference numeral 31 indicates a region of this primary support, and corresponding specifically to the region 1 of FIG. 2, wherein the first bits of the six words A to F are recorded in direct form. A beam of coherent light 32, preferably a laser beam, suitably collimated in order that its wave surfaces are plane and parallel, passes through this region and illuminates it in a substantially uniform manner. Following the diffraction due to the pattern of transparent and opaque areas, the equal-phase surfaces of the light waves of the emerging beam 33 are no longer plane and parallel, but assume a conformation depending on the whole information registered on region 31.

The beam 33 falls upon a photosensitive plate 40 and specifically on a region 35 of the same. By means of an optical system schematically represented by the semi-transparent surface 37 and by the mirrror 38, a reference beam 39, coherent with the incident beam 32, is projected on the same region 36 of the photosensitive plate 40. Due to the interference between the beam 33 and 39, the region 36 is illuminated according to a pattern of light intensity which depends, in any point on the differences in phase between the wave surfaces of the beam 33 and those of the beam 39 and therefore on the distribution of the information of the whole region 31. The photographic record of this distribution of illumination is the hologram 36.

In FIG. 5A a second region 41 of the plate 34 is shown, which carries the inverse recording of the first bits of the six words, corresponding to the region 1' of FIG. 2.

If the region 41 is put at the place of the region 31, and the incident beam is deflected along the direction 32', while the mirror is so displaced, that the reference beam follows the direction 39', the hologram of the region 41 is obtained on the plate 40, in a position 42 next to the hologram 36. Both holograms are recorded on the same photographic plate, but suitable screens, not shown, are provided to insure that the recording of a hologram does not interfere with the recording region of the other one.

As the process is repeated for the remaining eighteen regions of the primary information support 34, twenty holograms are obtained on the plate 40, each one of them corresponding to a region of the primary support.

Consider now FIG. 5B. It is known that, if a hologram, such as the one indicated by 35, is suitably illuminated by a coherent light beam having substantially the same characteristics of the reference beam 39, a reconstructed real image 45 of the primary information region 31 is obtained.

The reciprocal relations, concering dimensions, distance and location, of hologram 36 and reconstructed image 45 are the same as the correspondent relations of primary regions 31 and hologram 36 during the holographic recording. By using one of the known light deflection methods, the coherent beam 44 may be directed in succession to illuminate all the holograms recorded on the plate 40. The reconstructed images of all the regions 1 to 10 and 1' to 10' are obtained in succession in the same position and with the same dimension of the image 45. It is only for clarity and simplicity of representation that, in the drawings, the holograms referring to complementary regions, such 1 and 1', 1 and 2' of FIG. 2, are shown in adjacent collocation, and not on two different half-plates. Practically, the reciprocal location of the different holograms may be chosen at will.

Also in this case, wherein a single illuminating beam for the different holograms and a deflection system for their subsequent selective illumination are employed, the detector matrix must have memory characteristics as the one described with reference to FIG. 6.

As regards the controlled optical deflection systems, the beam 45 of FIG. 5B may be deflected for instance by the optacoustic deflection system described summarily at pages 477 and 478 of the cited book on Optical Holography. By such a device, or any similar one, the beam may be directed on any position characterized by a pair of coordinates X and Y.

In the example considered, four discrete positions of the horizontal deflection, corresponding to coordinates $X_1$, $X_2$, $X_3$ and $X_4$, and five discrete positions for vertical deflection, corresponding to coordinates $Y_1$, $Y_2$, $Y_3$, $Y_4$ and $Y_5$, are provided for a total of twenty positions corresponding to the twenty holograms.

Each hologram provides a reconstructed image in the same position and of the same dimension for all holograms, coincident with position and dimensions of the detector matrix 45.

To associatively interrogate the memory in the case of the considered example, the beam 44 is deflected to illuminate the regions of coordinates X of odd order ($X_1$ and $X_3$) for those bits of the descriptor having value ONE, and the regions of coordinate X of even order ($X_2$ and $X_4$) for the descriptor bits of value ZERO. The regions corresponding of "don't care" bits are not illuminated. With reference to the table of FIG. 4 the regions which are illuminated are: 1 ($X_1$, $Y_1$), 2($X_3$, $Y_1$). 3'($X_2$, $Y_2$). 4($X_3$, $Y_2$), 5'($X_2$, $Y_3$), 6($X_3$, $Y_3$), 9($X_1$, $Y_5$) and 10'($X_4$, $Y_5$).

Figure 6:
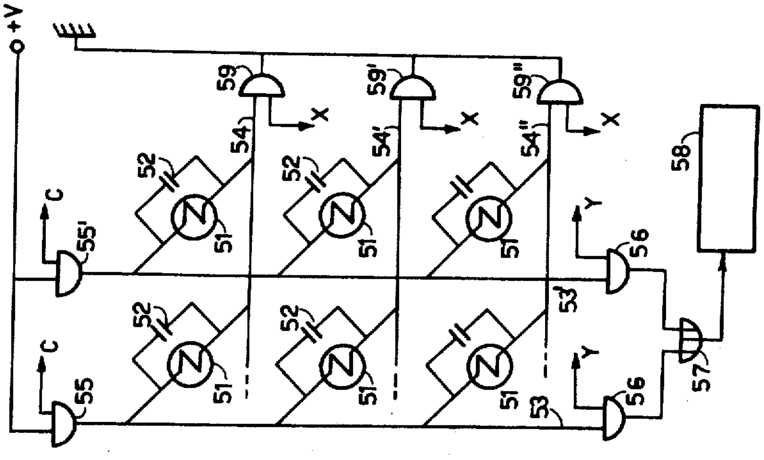
FIG. 6 is a simplified wiring diagram of another detecting matrix usuable with the first and second embodiments.

Each region provides a reconstructed image of the respective primary region, and all the reconstructed images are superimposed in succession on the detector matrix of the type, for example, of FIG. 6. As the process of selective illumination is accomplished, only the capacitors of the detector elements which have not been illuminated, remain charged; they are, as in the case of FIG. 1, the elements corresponding to words A, D. and F. The scanning of the detector matrix as described will give this result.

In the above described second preferred embodiment of the invention, two important characteristics of the holographic processes are exploited to obtain substantial advantages. Namely, the first one is the fact that the illumination values recorded in every point of the hologram depends on the whole information registered on the primary image: therefore the hologram is practically indifferent to small local defects, such as dust particles or small scratches. These defects may diminish the signal-to-noise ratio on the whole reconstructed image, but do not delete completely any information element. Thus a considerable improvement of the memory reliability and of the readibility of its content is obtained, which is specially important for associative memories, because it is the content which delivers the address. The second advantage is that the "fly-eye" optical system is no longer needed for superimposing the images of the regions of the detector matrix. This is obtained as a result of the characteristic properties of the holographic process. Also the focussing of the images of the detector matrix is less critical, due to the greater focal depth of the reconstructed images.

However, suitable optical system may be used for generating the holograms as well as reconstructing the images, if, for example, it is required that the dimensions of the holograms be different from the ones of the primary regions, or conversely, that the reconstructed image have different dimensions from those of the hologram.

It is also clear that, as in the first embodiment, both for recording and for reading out, in place of a single coherent light beam, a plurality of selectively controlled light sources may be used, one for each region of the hologram or of the primary support to avoid the use of electro-optical light deflector and light switches, and for obtaining the simultaneous reconstruction of the whole holographic plate.

The choice of the most suitable arrangement depends on economic, technological and practical considerations according to the specific characteristics of the memory; and arrangements combining appropriate features of each method may be employed, according to convenience.

It must be remarked that, in case some words must be excluded from the interrogation process, that is, have to be "masked," it is sufficient to avoid the sensing of the detector matrix elements which correspond to the masked words.

The above described devices may be used also for reading out at least a portion of the words, identified by the descriptor, which is not defined by the descriptor itself.

To obtain this, it is sufficient to light up in succession and singularly, for instance in the half-matrix DI of photoemitters with reference to FIG. 1, the photoemitters corresponding to the "don't care" bits of the descriptors. For each lit-up photoemitter the detecting matrix will show illuminated elements (corresponding to ONEs), and non-illuminated elements (correspoinding to ZEROs) for the homologous bits of the different words. Scanning the matrix and recording the read-out values, the word selected by the interrogation may be completed with the values not defined by the descriptor. The optical associative memories above considered are read-only memories, in which the recorded information cannot be changed. Optical modifiable memories, in which the recorded information may be changed, have been proposed and built, making use for instance of photochromic supports, or of photosensitive magnetic films, or other devices, wherein, however, the process of modifying the recorded information requires a time higher than the read-out time, and a different technology, comprising usually the use of very high energy intensity.

A third embodiment of the present invention describes an associative memory wherein the data may be recorded and read-out at the same speed, and which therefore may become the essential part of an associative computer. To this purpose, a recording system founded on the use of magnetic bubbles is described. The maagnetic bubbles technique being already known in the art, the system is, therefore described herein only with reference to the peculiar devices and arrangement adopted for this embodiment of the invention.

The magnetic bubbles are known, and described for instance in the article by Harry R. Karp "Magnetic Bubbles--A Technology in the Making," published in Electronics of Sept. 1, 1969, page 83 and following. Briefly described, it is based on the fact that a rare-earth orthoferrite crystal, for example a thulium or terbium orthoferrite, shows a preferred magnetizing direction, and, when cut into a plate approximately 50 microns thick, with the surfaces orthogonal to said direction, it produces "domains" extending through the whole depth of the plate and having their magnetic moments perpendicular to the surface in mutually opposed directions. If a magnetic field of given direction, and suitable intensity, is applied normally to the surface of the plate, the domain having the magnetic moments oriented in opposition to the field are reduced in extension and assume the shape of small cylinders of circular cross-section, 25 to 50 microns in diameter, which may be generated, displaced and annihilated by local variations in the magnetic field, for instance by means of electrical currents flowing in thin conductor leads deposited on the surface of the plate.

These domains, or magnetic "bubbles," rotate the polarization plane of the light by an angle different from that of the rest of the plate. Therefore if a plate of orthoferrite containing magnetic bubbles is illuminated in transparence by light polarized in a given plane, and is observed through an analyzing means suitably oriented, the magnetic bubbles may be made to appear either as transparent spots in an opaque field, or as opaque spots in a transparent field, and may therefore be detected in a non-destructive manner by photodetector devices, such as photodiodes and phototransistors.

Figure 7:
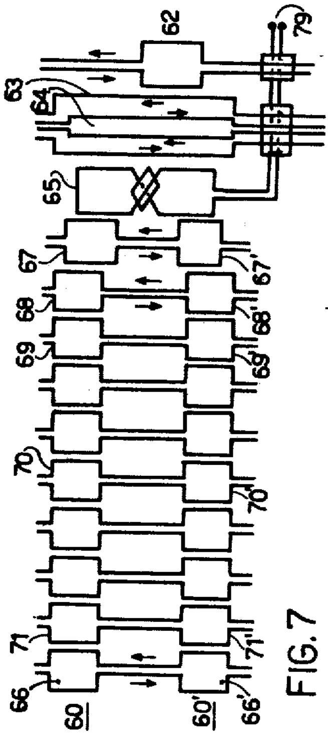
FIG. 7 is a schematic simplified representation of a double shift register and accessory devices according to a third embodiment using the magnetic bubble technique.

FIG. 7 shows, schematically, the layout of a double shift register for magnetic bubbles, with the device for generating and annihilating the same. More precisely, it shows two shift registers 60 and 60', for complementary recording. Assuming as binary level ONE the presence of a bubble in a memory location of the registers, only one bubble is always present in any pair of corresponding locations of the registers. These registers and associate devices consist in a set of loops of conducting metal, for example gold, deposited on the surface of the plate in thin layers of the width of approximately 10 microns through which a suitable current may pass for locally increasing or diminishing the field acting on the plate. The loops 62, 63 and 64 are used for generating the magnetic bubbles. A double loop 65 with crossed connections may contain a bubble in one only of its two loops and is used as an input either to one or to the other of the registers 60 and 60'.

In FIG. 7, each register comprises nine loops. It is required, for the stability of the bubbles, that two consecutive bubbles be separated by a distance at least equal to two bubble diameters; therefore only each third loop, such as the loops 69, 70, and 71 and respectively 69', 70', and 71', is effectively used as a storage location.

Two loops 66 and 66', at the left end of the registers, are used for the serial reading-out of the content of the registers and to cancel the bubbles after reading-out.

The device for generating the bubbles is based on a known process of duplication of the bubbles. If the orthoferrite crystal plate is submitted to a constant magnetic field of suitable intensity the magnetic bubble has a given diameter, for instance 50 microns. If the field is locally decreased, the bubble expands; if it is increased, the bubble contracts. The bubbles tend to migrate in the direction of decreasing field, and assume a stable position in correspondence with minimum field regions.

Figure 8:
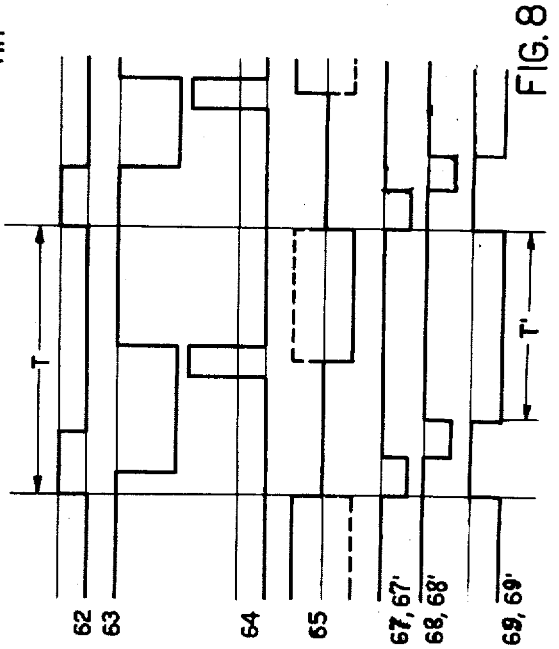
FIG. 8 shows the diagrams of the magnetic field in different points and at different times for the device of FIG. 7.

If a bubble is made to expand by a local decrease of the field, and, then, a strong field is applied in a narrow region along the diameter, the bubble is divided in two distinct bubbles which tend to separate. The double shift register schematically represented in FIG. 7 is assumed to be part of a set of identical registers located on the same orthoferrite plate, above and under the same, having the loops serially fed by the same current flowing through the shown registers, as indicated by the arrows. Its operation is described also with reference to the diagrams FIG. 8, which represent in a purely indicative and schematic way, the local and temporary changes of the magnetic field due to the currents flowing in the loops. Each diagram of FIG. 8 is indicated by the same reference number which indicate in FIG. 7 the loop or the loops to which it refers.

In all diagrams, the null line corresponds to the intensity of the constant external magnetic field, the positive changes to an increase of the field caused by a current assumed as positive and the negative changes to a decrease of the field due to a current assumed as negative. It is recalled that the bubbles tend to move away from higher field regions towards lower field regions.

The process is iterative and comprises a continued repetition of periods of length T. At the end of each period, a bubble is located either on the upper or on the lower loop of the double loop 65, ready to enter and be shifted along the upper or lower register 60 or 60'; and a bubble initially located in a storage position has been shifted towards the left by three loops occupy the following storage position.

Initially a bubble is contained in the loop 62, through which a negative current flows causing a local lower value of the field, therefore holding the bubble in place.

At the beginning of the period T, the loop 62 is deenergized; and the loop 63 is negatively energized, to cause the decrease of the magnetic field at its inside. Therefore, the bubble is moved from loop 62 to loop 63 and at the same time is expanded due to the lower value of the field. Now a strong positive current pulse is sent into bubble 64, enclosed by the loop 63, in order to strongly increase the field along a diameter, of the bubble. The bubble is thus divided into two separate bubbles, one of which returns in the loop 62, where the negative current has been restored, and the other of which is moved either to the upper or to the lower loop of the double loop 65, according to the direction of the current, which cause a mutually opposed variation of the field intensity in each loop.

If a ONE is wanted for register 60, a current is sent in the double loop 65, by means of the terminal 79, in such direction, as to decrease the field in the upper loop and to increase it in the lower loop. Thus, the bubble originated by the duplication of the original bubble goes in the upper loop at the input of register 60. The contrary takes place if the current is flowing in the double loop 65 in the opposed direction. The diagram 65 indicates with a solid line the field pulling the bubble in the upper loop and with a dashed line the field in the lower loop, in case the bubble is pulled in the upper loop.

At the beginning of a new period, while preparing a new duplication of the bubble staying in the loop 62, the bubble located in the loop 65 is shifted along the register 60 or 60', to occupy the next storage position. To obtain this, the loops 67, 68 and 69, and, at the same time intervals the loops 67', 68', 69', are energized with negative current pulses in succession. The energizing pulses of the loops 68 and 69, and respectively loops 68' and 69', have a relatively short duration; and therefore the bubble which, for example, is on the upper loop of the double loop 65, moves rapidly through loops 67 and 68 to stay for a longer time, T', in the storage position 69. If the bubble is in the lower loop, it will go over to loop 69'. In the whole register, all the loops following the storage loop are energized at the same time as loop 67; all the loops preceding the storage loop are energized in the same time as loop 68;

and all storage loops are energized at the same time as loop 69. Therefore, in the first following period the bubble goes over from position 69 (or respectively from position 69') to the position 70 (or respectively into position 71'). The bubble enters afterwards the loop 66 where it remains the most part of a whole period in the final part of which a strong increase of the positive current cancels the bubble.

All the corresponding loops of the different registers, and of the bubble duplicating and cancelling devices, are energized at the same time by the same currents by pulse-distributing bus leads which are not represented in the figure. Only the energizing of the double input loop 65 is individual for each pair of registers, and depends on the direction of the current sent through the terminals 79.

Figure 9:
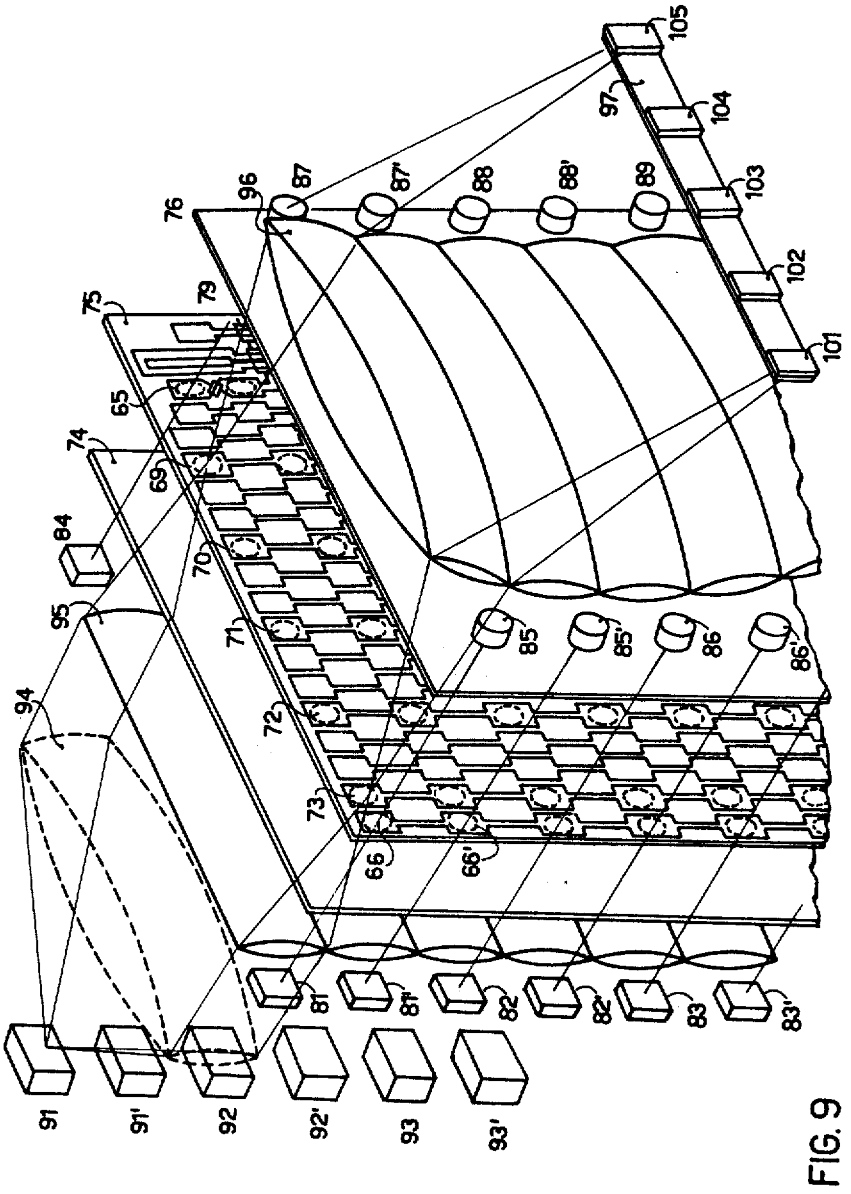
FIG. 9 is a schematic perspective view of an associative read-write magnetic bubble memory, and of the electro-optic input-output device according to said third embodiment.

FIG. 9 represents partially and schematically a device according to this embodiment. A plate of orthoferrite 75 carries on the forward face, as seen by the drawing, the loops needed for constituting a set of registers, each with the bubble generating, distributing and cancelling devices as shown by FIG. 7.

It is assumed in the figure that the device comprise three pairs of registers, each one with five storage locations. A bit is assigned to each pair of registers, and a word to each storage position: therefore the device of FIG. 9 has the storage capacity of five three-bit words. The plate is enclosed between two sheets: a polarizing sheet 74 and an analyzing sheet 76.

The characteristics of these sheets are so chosen that the polarization plane of the light determined by the sheet 74, if rotated through a certain angle by a magnetic bubble, becomes perpendicular to the polarizing plane of the sheet 76. Thus, the magnetic bubbles observed through the sheet 76, appear as opaque spots in an illuminated background. To increase the signal-to-noise-ratio, the surface of the plate 75 facing the sheet 74, is covered by an opaque and light-absorbing material, with the exception of the dashed-line small disks of the approximate dimension of the bubbles, in correspondence with the double loop 65, of the storage locations 69, 70, 71, 72 and 73 in the reading out loop 66, and in the loop corresponding to these in all registers.

Each upper register of each pair shows therefore, during the time interval T' of each period T, a plurality of illuminated storage positions, corresponding to ZEROs, and a plurality of dark storage positions, corresponding to ONEs where the storage positions are occupied by the bubbles. The lower register of each pair shows the complementary pattern. An illuminating device comprising an electronically controlled light source, for instance a photoemitter, is assigned to each register. In FIG. 9, the photoemitters assigned to the registers of the upper pair are indicated by 91 and 91', those assigned to the middle pair of registers are indicated by 92 and 92', and those assigned to the lower pair by 93 and 93'. In each register pair, the photoemitters 91, 92, and 93 are assigned to the upper registers, which record the information in direct form, and the photoemitters 91', 92' and 93' are assigned to the lower registers, recording the information in complemented form.

An optical system represented schematically in FIG. 9 by the lens 94, shown by dahsed lines and assigned to photoemitter 91, collimates the emitted light in a rectangular beam of parallel light rays. Other such optical systems, not shown in the drawings, are assigned to the other photoemitters. The beams are focussed through an optical device comprising a set of cylindrical lenses in such a way that the light emitted by each photoemitter, after passing through the polarizing sheet 74, illuminates a strip of the plate comprising a register approximately as high as a bubble.

The light emerging from the storage location of the different registers containing a ZERO is focussed by an optical fly-eye device 96 in such a way as to project an image of the luminous spots of each register on a single screen 97 supporting photosensitive elements, such as photodiodes or photoemitters 101, 102, 103, 104 and 105 located to match one image each of the five storage locations of every register, corresponding to the five words having the bits arranged in the same column. The associative interrogation of the information recorded in the different registers is effected by lighting up at the same time, the photoemitters such as 91, 92, and 93 associated with the registers corresponding to those bits which in the descriptor have value ONE, and those such as 91', 92', and 93' for the descriptor bits having value ZERO. The photoemitters corresponding to "don't care" bits are not lit up. During the period T' the set of photosensitive elements is sensed to determine which ones are not illuminated: they correspond to the words which match the descriptor.

In correspondence with the read-out positions such as 66 and 66', and the corresponding positions in the other registers, there are photoemitters 81, 81', 82, 82', 83, and 83'. The emitted light passing through the polarizing plate 74, the read-out positions, and the analyzing plate 76 may reach as many photodetectors, such as photodiodes or phototransistors, only four of which 85, 85', 86, and 86' are represented in FIG. 9. This arrangement of photoemitters and photodetectors allows the detection of the presence of magnetic bubbles in the read-out loops. In order for proper operation, the output of each pair of photodiodes, such as 86 and 86' and 87 and 87', must be complementary. This redundancy increases the reliability of the system. The outputs of the photodiodes, as for example, photodiodes 85 and 86 and the omitted ones corresponding to the lower pair of registers give out, in parallel, the three-bit word which has just come out of the register.

The bits may be processed according to suitable instructions in as many arithmetical units connected to the output leads of the photodiodes. The bits resulting from this processing are introduced in the input loops, such as 65, of all the register pairs.

A device comprising a set of photoemitters arranged in registration with the upper and lower loops of the double input loop such as 65, (the photoemitter 84 only being shown) and a set of associated photodetectors 87, 87', 88, 88', 89 . . . allows the checking of the complementarity of the information contained in the upper and lower input loops 65 and the correctness of the information loaded in the different registers as a consequence of the data elaboration.

Usually the information is shifted along the registers from the input loops 65 to the output loops 66, and corresponding loops; may be associatively read out by lighting the proper photodiodes, such as 91 and 91', and by sensing the outputs of the photodetector elements 101 to 105; and may also be read out by word by the photoemitters 81 and 81' and photodiodes 85 and 85', and corresponding photodiodes.

An associative memory as described may, as said, form the essential part of a complete associative computer, if it is integrated with a number of arithmetical units equal to the number of bits, a control unit, an instruction memory and suitable input-output devices. It may be remarked that in other prior art associative memories forming part of proposed associative computers, each shift register memorizes a word, and therefore the words must be serially elaborated by bits, according to the instructions. On the contrary, in the memory according to the present invention each shift register pair contains all bits of the same order of all the words, and the arithmetical units assigned to any single register may elaborate each word in parallel, operating serially by words.

It is fully evident that a number of modifications and variants may be made to the described device. For instance, it may be convenient to build up the detector elements 101 to 105 by means of devices having memorizing properties such as the device described with reference to FIG. 5, in order to be able to sense the elements even outside the period T'. In addition, the set of photoemitters 91 to 93' may be substituted by a single vertical scanning light beam, controlled by an electrooptical deflector and switch. The same method may be applied to the set of read-out photoemitters 81 to 83' and the checking photoemitters 84 and the like, in which case only the scanning device, and not the light switch, are necessary. If the input and output redundancies are given up, the output loops such as 66', the corresponding photoemitters 81', 82', 83', and the associated photodetectors as well as the corresponding input device may be omitted.

If the thickness of the orthoferrite plate and of the magnetic bubbles, and the optical rotating power of the material is such, that the polarization plane is rotated by 90°, the complementing register of each pair may be abolished, and each register may be illuminated, for the associative reading out, in a first time interval, by polarized light in a plane such that the bubbles appear opaque in a transparent background for direct reading out, and, subsequently, by a light polarized at 90° with respect to the light in the first time interval, the bubbles thus appearing as transparent spots in an opaque background, for the inverted reading-out.

The present invention may also be applied in case the information registered on a proper optical support is read out by light reflected by the support, instead of transmitted through the support. This may be convenient whenever the information is registered by means of devices applied on a face of the optical support, adapted for modulating the light reflected by the opposite face which is selectively illuminated by one of the already described methods, that is, either by means of a matrix of light sources, or by a controlled deflected light ray. These light-modulating devices are capable of causing binary variations of the optical response of the reflected light, that is, variation between two discrete values in direction, or intensity, of phase, or polarization plane, according to their nature or method of use, and the methods for realizing the same are outside the scope of the present invention. One of the proposed devices of this sort is based on the property of the liquid crystal for reflecting or scattering the light according to the presence of absence of a proper electrical field.

A device of this kind is summarily described by J. A. Raichmann in the article "Promise of Optical Memories" published in the Journal of Applied Physics, March 1970, pp.1376–1383, and may easily be applied to form an associative optical read-write memory along the described lines.

While preferred embodiments of the invention have been shown and described, it will be apparent to those skilled in the art that changes can be made without departing from the principles and spirit of the invention, the scope of which is defined in the appended claims.

The invention claimed is:

1. An optical associative memory system, comprising an optical support for recording information by means of a variable optical response to illumination of elementary areas in dependence on the recorded information, the optical response of each elementary area of the support being dependent on the transparency of said elementary area in the presence of polarized incident the transmitted light, said recorded information comprising a plurality of words formed each by an ordered set of an equal number of bits, illuminating means for illuminating said support, and an array of electro-optical detector elements for generating electrical signals in response to the illumination of said detectors, said system being characterized in that:

each bit is recorded both in a first direct form and in a second inverse form, complementary to the first direct form;

said support comprises a plurality of bit regions, each one recording in the same form the bits of equal order of all the recorded words;

said illuminating means selectively illuminates at least one of said regions with polarized light;

said array of detector elements comprises a number of detectors equal to the number of words which may be recorded on the support;

the optical response of each bit region to the illumination is concentrated on said array of detector elements, each detector being responsive to the illumination resulting from the cumulative optical response of all the illuminated bits of a single word;

said recording support includes a plate of crystal of rare-earth orthoferrite subject to a magnetic field and provided on at least a face with a suitable pattern of electrical conductors for generating local variation in said magnetic field in response to electrical current flowing therethrough, for generating duplicating, displacing or cancelling magnetic bubbles, said conductors forming magnetic bubble shift registers for recording the information by means of the presence or absence in predetermined time intervals of magnetic bubbles in prearranged memory locations, the presence of said bubbles being detected as a variation of the optical response of said incident polarized light emerging from an analyzing device;

said shift registers are grouped in pairs of registers, each pair being assigned to the bits of equal order of all recorded words, homologous memory locations in each register of each pair being assigned for recording respectively in direct and inverse form the bits of the same word;

said illuminating means selectively illuminates at least one of said registers; and said system comprises in addition a "fly-eye" optical device for focusing and superimposing the images of the iluminated register on said array of detector elements.

2. The optical associative memory system of the claim 1, wherein at least an output memory loction for each pair of registers is provided for holding in said location a magnetic bubble.

3. The optical associative memory system of the claim 2, wherein an input device is provided for introducing a magnetic bubble in a mutually exclusive way in either one or the other of the registers comprised in a same pair, said input device comprising a pair of memory locations for holding a bubble in either one or the other of said memeory locations.

* * * * *